United States Patent [19]

Boothroyd et al.

[11] 4,411,635

[45] Oct. 25, 1983

[54] SHEAR OVERLOAD RELEASE COUPLING

[75] Inventors: Howard W. Boothroyd; Lawrence A. Carlsmith, both of Amherst, N.H.

[73] Assignee: Ingersoll-Rand Company, Woodcliff Lake, N.J.

[21] Appl. No.: 208,497

[22] Filed: Nov. 20, 1980

[51] Int. Cl.³ .............................................. F16D 9/00
[52] U.S. Cl. ......................................... 464/33; 403/2
[58] Field of Search .......... 464/32, 33; 402/2, DIG. 3

[56] References Cited

U.S. PATENT DOCUMENTS

| 3,000,577 | 9/1961 | Ferguson | 464/33 X |
| 3,124,361 | 3/1964 | Haberland et al. | 64/28 R |
| 3,126,723 | 3/1964 | Dugay | 64/28 R |
| 3,247,735 | 4/1966 | Bonnafe | 64/28 R |
| 3,683,713 | 8/1972 | Brucher | 64/28 R |
| 3,855,818 | 12/1974 | Hochreuter | 64/28 R |
| 3,982,408 | 9/1976 | Wright | 64/28 R X |
| 3,999,404 | 12/1976 | Banki et al. | 64/28 R |

FOREIGN PATENT DOCUMENTS

| 2420515 | 4/1975 | Fed. Rep. of Germany | 464/32 |
| 2315036 | 1/1977 | France | 64/28 R |
| 502664 | 3/1939 | United Kingdom | 464/32 |
| 914667 | 1/1963 | United Kingdom | 464/32 |

Primary Examiner—Stuart S. Levy
Assistant Examiner—Daniel P. Stodola
Attorney, Agent, or Firm—F. S. Troidl

[57] ABSTRACT

A coupling between a driving shaft and a driven shaft includes a replaceable insert which shears at a predetermined torque.

3 Claims, 4 Drawing Figures

SHEAR OVERLOAD RELEASE COUPLING

This invention relates to couplings between a driving member and a driven member. More particularly, this invention is a novel machine including a shear overload release coupling.

Often failures of couplings between a driving member and a driven member occur in the field. Replacement elements are often not available or a large number of replacement elements are needed, thus requiring undue down-time for the machine. This invention is a machine with a new shear overload release coupling which includes a replaceable member which shears at a predetermined torque value. Thus, when a failure occurs in the field, it is only necessary to replace the small sheared element. The shear elements may be kept on-hand in the field, and require no additional machining before they can be placed into operation in a machine.

Briefly described, the invention includes a rotatable driving member and a rotatable driven member with bearing support means located between them. Interconnecting means including a frangible member interconnect the two rotatable members. The frangible member includes a portion adapted to shear with the application of a predetermined torque.

When the frangible member shears, the driven member stops turning. The driving member may continue to rotate freely on the bearing means between the driving member and the driven member. Thus, damage to elements in the machine other than the frangible member is prevented. After the driving member is stopped, the frangible member may be removed and replaced with a new frangible member.

The invention as well as its many advantages may be further understood by reference to the following detailed description and drawings in which.

In the various figures, like parts are referred to by like numbers.

Figures 1, 2, 3, 4:
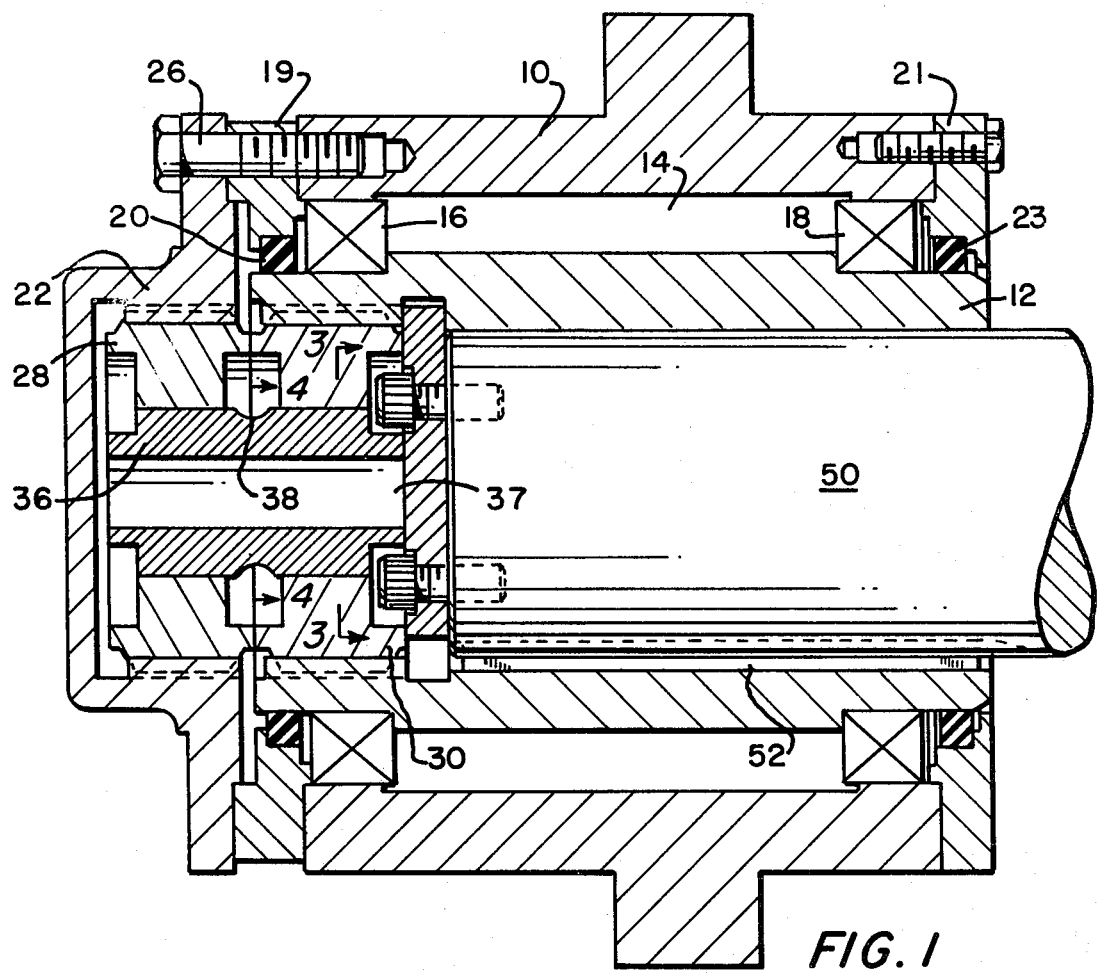
FIG. 1 is a side elevational view, partly in section, showing one preferred embodiment of the invention.
FIG. 2 is a side elevational view showing the disconnecting of the driving member and the driven member after the frangible member is sheared.
FIG. 3 is a sectional view taken along lines 3—3 of FIG. 1 and in the direction of the arrows.
FIG. 4 is a sectional view taken along lines 4—4 of FIG. 1 and in the direction of the arrows.

Referring to the drawings, and more particularly, to FIG. 1, a rotatable driving member such as outer hub 10 is mounted about a rotatable driven member such as inner hub 12. The outside diameter of the inner hub 12 is less than the inside diameter of the outer hub 10 thus providing an annular space 14 which is filled with grease. The inner hub 12 may rotate another member, such as shaft 50 which is keyed to the hub 12 by a key 52 extending into a groove in shaft 50.

Anti-friction bearings 16 and 18 are provided adjacent the longitudinal ends of the annular space 14. The bearings 16 and 18 are kept in position by front bearing cap 19 and rear bearing cap 21, respectively, with caps 19 and 21 retaining lip seals 20 and 23 in position to prevent the escape of grease from the annular space 14.

A removable drive cap 22 having a coaxial splined internal bore is attached to the outer hub 10 by screws 26 (only one shown in the Figures). The front end of the bore of the inner hub 12 is also splined with the splines on the drive cap 22 and the splines on the inner hub 12 being adjacent.

A first adapter 28 has external splines engaging the internal splines of the drive cap 22. A separate identical adapter 30 has external splines engaging the internal splines of the inner hub 12. Preferably, the adapters 28 and 30 have aligned square bores and frangible member 36 with a central bore 37 extends through the bores of the adapters 28 and 30. The outside perimeters of the frangible member 36 portions within the adapter bores are preferably square-shaped (see FIG. 3). The squares are dimensionally controlled for spline tooth alignment and a loose fit.

The frangible member 36 has on its outside perimeter and centrally located longitudinally, a neck section or an annular reduced thickness portion 38. The reduced thickness 38 provides a relatively highly-stressed torsional shear area concentric with the axis. The torque value at which the frangible element 36 shears is a function of the material and the thickness of portion 38. A small amount of ancillary end play is allowed in the axial confinement of the adapters and the frangible member 36.

In operation, it is absolutely necessary to provide for sufficient rigidity of the entire drive assembly to prevent fretting action from destroying or degrading the frangible element, yet provide for adequate rotational support of the outer hub 10 during coast-down after shear failure and activation of the zero speed switch. During normal operation, the power of the driving member 10 is transmitted through the interconnecting means including drive cap 22, adapter 28, frangible element 36, and adapter 30 to the inner hub 12. If an overload occurs in the machine, the frangible element 36 will instantly shear at the reduced thickness area 38. The camming action of the sheared ends will cause the broken parts of the frangible element 36 to separate enough to clear the interconnection between the outer hub 10 and the inner hub 12. The inner hub 12 will stop rotating; however, the outer hub 10 and its half of the drive spline continues to rotate, supported entirely by the two roller bearings 16 and 18. Thus, the outer hub 10 will rotate for a short period of time after the interconnection is sheared, thus preventing damage to other elements in the machine.

After the overload problem has been resolved, the removable drive cap 22 may be removed by removing the screws 26, the parts of the broken frangible element 36 extracted, and replaced with a new frangible element.

We claim:

1. In combination: an outer rotatable driving member; a coaxial inner rotatable driven member with an outside diameter less than the inside diameter of the outer rotatable driving member thereby providing an annular space between the outer rotatable driving member and the inner rotatable driven member; roller bearing means in said annular space between the rotatable driving member and the rotatable driven member; interconnecting means interconnecting the rotatable driving member and the rotatable driven member and including a single coaxial frangible member adapted to shear at a predetermined torque, a removable drive cap having a bore with internal splines and connected to the outer rotatable member, a first adapter with external splines engaging the splines on the drive cap, a second adapter with external splines engaging splines on the driven member, each adapter having a central bore, said coaxial frangible member extending through the bores of the adapters, the shape and dimension of the adapter bores and the shape and dimension of the outside of the frangible member being such that the frangible member fits in the bores so that rotation of the outer rotatable driving member imparts rotation to the inner rotatable driven member and whereby the frangible member is sheared if said predetermined torque occurs, the rotatable driven member no longer rotates, the outer rotatable driving member rotates about the inner rotatable driven member on the roller bearing means for a short time after the frangible member is sheared, the removable drive cap may be removed and the sheared frangible member replaced.

2. The combination of claim 1 wherein: the frangible member has a reduced thickness portion with the shear occurring at the reduced thickness portion.

3. The combination of claim 2 wherein: the adapter bores are square-shaped in cross-section and the outside perimeters of the frangible member portions within the adapter bores are square-shaped.

* * * * *